March 1, 1955 C. V. ROBERTS 2,703,118
INSERTED TOOTH FOR CIRCULAR SAWS FOR FROZEN TIMBER
Filed May 11, 1949
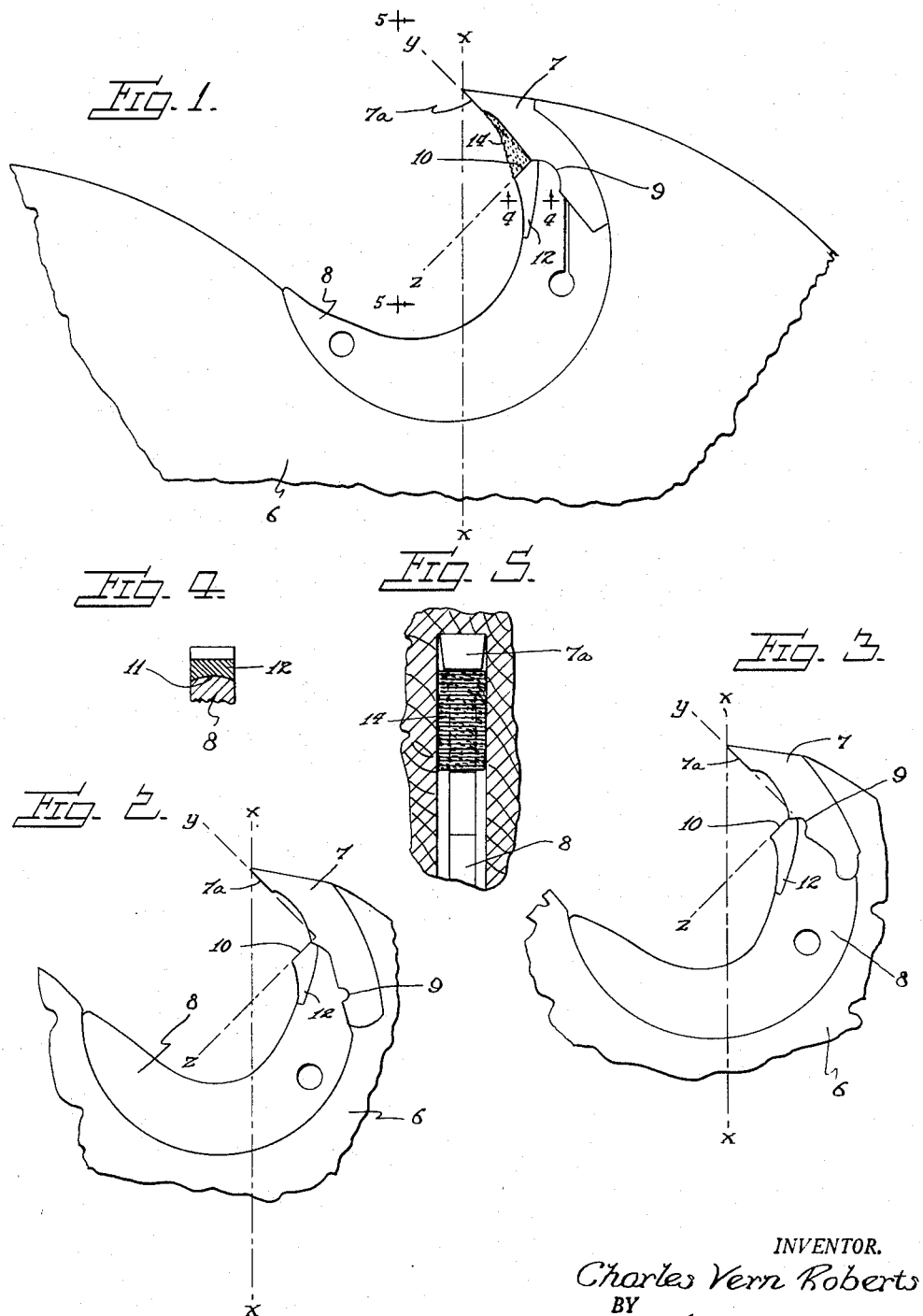
INVENTOR.
Charles Vern Roberts
BY
Greek Wells
atty.

United States Patent Office 2,703,118
Patented Mar. 1, 1955

2,703,118

INSERTED TOOTH FOR CIRCULAR SAWS FOR FROZEN TIMBER

Charles Vern Roberts, Spokane, Wash.

Application May 11, 1949, Serial No. 92,577

3 Claims. (Cl. 143—141)

My present invention relates to improvements in inserted tooth for circular saws for frozen timber.

The difficulties of sawing frozen timber into lumber are well known. They are particularly damaging where circular saws with removable teeth are used for sawing. It is not uncommon for the saw to be crowded so far off its natural course through a log that it becomes wedged in the log so tight that it has to be chopped out. The removable teeth are sometimes thrown out. Dimensions cannot be held uniform from end to end of the cut pieces.

It is the purpose of this invention to make a simple change and addition to the locking circles that secure the removable teeth in place, which will keep the circular saws running true through frozen timber. Moreover, the addition of the circle is of such nature that, after the season of frozen timber is past, the circles can be quickly converted for use in the usual way with timber that is not frozen. Insofar as I am aware, it has not heretofore, been possible to overcome the difficulties mentioned above, of sawing frozen timber with a removable tooth circular saw. My improvement has been tested under very difficult conditions and has been successful.

I am aware that heretofore, it has been proposed to provide the locking circles with sharp teeth which are intended to cut and break up splinters, tough bark etc. as they strike the circle to prevent packing.

According to my invention I provide a ledge adjacent to the junction of the tooth and circle, which faces outwardly and forwardly to cause a certain amount of the sawdust to come to rest close to the surface. The face of this ledge bears a rather critical relation to the inwardly facing front surface of the tooth at its cutting edge. For optimum results the ledge surface must lie in a plane substantially perpendicular to the inwardly facing front face of the tooth adjacent to the cutting edge. Also the ledge surface should lie in a plane at an angle of forty-five degrees to a line drawn from the saw eye or center through the cutting edge of the tooth.

The nature and advantages of my invention will appear more fully from the following description and the accompanying drawings illustrating a preferred embodiment of the invention.

In the drawings:

Figure 1 is a fragmentary view of a portion of a circular saw showing my invention;

Figure 2 and 3 are views similar to Figure 1, showing the invention applied to removable teeth and circles of two other well known types of removable tooth circular saws;

Figure 4 is an enlarged fragmentary sectional view on the line 4—4 of Figure 1; and Figure 5 is a view looking in the direction indicated at 5—5 in Figure 1, illustrating how the sawdust is trapped, according to my invention, to keep the saw from being crowded out of its true path.

Referring now in detail to the drawings, my invention is shown as applied to a circular saw 6. The line x—x is a line drawn through the eye or center of the saw and the cutting edge of the tooth 7. The tooth 7 is mounted in the saw by means of a circle 8 which interlocks with the tooth at 9. The details of the construction by which the tooth 7 and circle 8 cooperate to hold the tooth 7 in place are well known in the art and since they form no part of my invention they have not been illustrated. Three well known types of tooth and circle constructions are illustrated in Figures 1, 2 and 3 of the drawings to indicate that my invention is not limited to any particular type of removable tooth or circle.

It has always been a very difficult problem to cut frozen green timber with a circular saw. It seems that the saw cannot be held to a true course through the log. Without delving into an extensive theoretical discussion I explain the success of my invention in sawing frozen timber as follows:

When a circular saw is cutting through frozen timber, the crowding of the saw out of line is due to fine frozen particles of sap and sawdust getting between the saw and the wood. These particles have little chance to accumulate evenly on both sides of the saw and as soon as they build up more on one side or the other they tend to crowd the saw out of a straight path. The very nature of a circular saw enables this crowding to deflect the saw because the saw is quite flexible and since the deflection is not at the cutting edge but is inwardly thereof, it directs the cutting edge at an angle to the true course the saw should take. My invention provides a means for utilizing the sawdust itself as a brush to sweep the wood surfaces on both sides of the saw free of the fine particles that cause the damage and thus prevent the saw from being bound by the build up of the icy particles on one side of the saw.

According to my invention I provide a flat faced ledge 10 at the forward or tooth end of the circle. For the best results in cutting frozen timber the advance face 7a of the tooth should be at an angle of forty-five degrees to the radius x—x from the eye of the saw througn the cutting edge of the tooth. This is indicated by the line y in Figures 1, 2 and 3 of the drawings. The ledge 10 has its sawdust receiving surface facing outwardly and forwardly with respect to the direction of travel of the saw. For the best results this ledge surface should lie in a plane at right angles to the face 7a of the tooth. This plane makes an angle of forty-five degrees with the radius x—x as indicated by the line z in Figures 1, 2 and 3. The function of the ledge 10 is to provide a surface against which sawdust cut by the tooth 7 will lodge crosswise and build up immediately back of the cut face 7a of the tooth. The ledge in no sense is a tooth or cutter. Its value would be destroyed if it were to be set at an angle so as to cut the sawdust. With this ledge 10 acting to catch and build up a small body 14 of sawdust, the small ice particles and particles of frozen wood are swept forward and prevented from adhering to the already cut faces on both sides of the saw. It is of course, evident that the small pocket of sawdust will frequently break away from the ledge but in doing so it moves inwardly toward the open circle and a new deposit of sawdust quickly forms in the pocket.

I prefer to form the ledge 10 at the forward end of the circle of a very hard metal alloy or material since it is subjected to intense wear. In order to do this I cut down the circle material as indicated at 11 in Figure 4 and build up an insert 12 of the hard material. The hardened material 12 is welded in place according to well known practice.

The application of my invention to the circle 8 does not make the circle unfit for sawing timber that is not frozen. In fact, it provides a hard facing that can be utilized to protect the circles at the point of greatest wear. If it is desired to return the circle to its original form for summer cutting, the ledge 10 is ground off to bring the circle back to its original shape which has been determined to be most efficient for cutting unfrozen timber.

It is believed that the nature and advantages of my invention will be evident from the foregoing description.

Having thus described my invention, I claim:

1. In an inserted tooth circular saw, the combination with the tooth and circle thereof, of a transverse flat ledge on the tooth receiving end of the circle facing forwardly in the direction of rotation of the saw and outwardly toward the cutting edge of the tooth, said ledge extending forwardly from the tooth and lying in a plane parallel to the saw axis and substantially at forty-five degrees to a radial line from the saw axis through the cutting edge of the tooth whereby the ledge is operable to intercept cuttings form the tooth and hold them as a brush to sweep the wall surfaces in the channel cut by the saw.

2. In an inserted tooth circular saw, the combination with the tooth and circle thereof, of a forwardly and outwardly projecting ledge at the junction of the tooth and circle, the ledge and the advancing face of the tooth at the cutting edge being substantially at right angles to each other, and at substantially forty-five degrees to a radial line from the saw center through the cutting edge of said tooth.

3. In an inserted tooth circular saw, the combination with a tooth having its front face immediately inside the cutting edge extending substantially at right angles to the plane of the saw and rearwardly at an angle of approximately forty-five degrees to a radial line from the saw center through the cutting edges, of a transverse sawdust receiving ledge rearwardly of said front face, said ledge extending forwardly from the tooth and lying in a plane parallel to the saw axis and substantially at right angles to said front face.

References Cited in the file of this patent

UNITED STATES PATENTS

| | | |
|---|---|---|
| 340,051 | Krieger | Apr. 13, 1886 |
| 1,687,448 | Hildreth | Oct. 9, 1928 |
| 2,334,928 | Hollenbeck | Nov. 23, 1943 |